Oct. 16, 1934.  H. A. MULLETT ET AL  1,977,079
LAVATORY FOUNTAIN
Filed April 24, 1933

INVENTORS
Howard A. Mullett
Herman E. Heine
BY
Quarles & French
ATTORNEYS

UNITED STATES PATENT OFFICE 1,977,079

LAVATORY FOUNTAIN

Howard A. Mullett and Herman E. Heine, Milwaukee, Wis., assignors to Bradley Washfountain Company, Milwaukee, Wis., a corporation of Wisconsin Application April 24, 1933, Serial No. 667,584

6 Claims. (Cl. 4—166)

The invention relates to lavatory fountains.

The object of the invention is to provide certain improvements in lavatory fountains wherein the washing water is discharged from an axial point radially outwardly towards the sides of a basin so that a number of persons may wash at the fountain at the same time. More particularly according to the present invention the fountain has a vent pipe associated with a trap disposed below the discharge or drain and the washing water while discharged from above the basin is brought into the apparatus from below and through a passage associated with the trap.

The invention further consists in the several features hereinafter set forth and more particularly defined by claims at the conclusion hereof.

Figure 1:
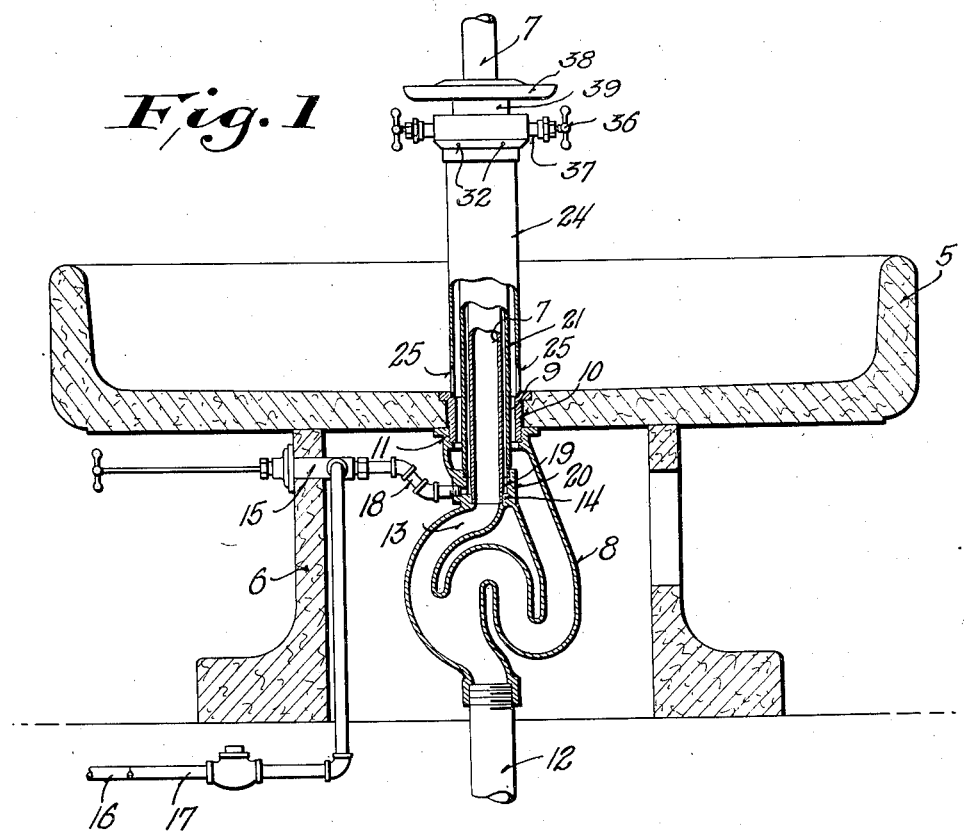
Fig. 1 is a vertical sectional view through an apparatus embodying the invention, parts being broken away and parts being shown in section.
Figure 2:
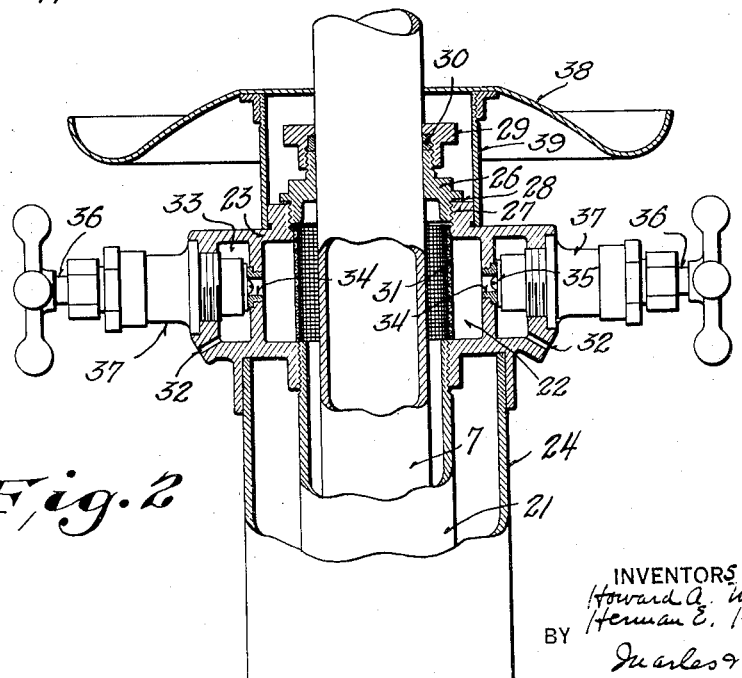
Fig. 2 is an enlarged detail sectional view through the discharge portion of the apparatus.

In the drawing, the numeral 5 designates a wash basin or bowl, 6 a support or pedestal for said basin, 7 a vent pipe, and 8 a trap associated with said vent pipe and the drain passage 9 from the basin.

A flanged tube 10 forms the wall of the passage 9 and its lower threaded end projects below the bottom of the basin 5 and connects with the threaded upper end 11 of the trap 8.

The trap 8 has the usual connection with the waste pipe 12 and the branch 13 is threaded at 14 to connect with the lower end of the vent pipe 7.

The numeral 15 designates a suitable mixing valve structure with which the hot water pipe 16 and the cold water pipe 17 communicate and from which the tempered supply water is discharged through the pipe 18 which communicates with an annular space 19 formed in the trap between the vent pipe 7 and the annular wall portion 20 of the trap.

A pipe 21 connects the space 19 with the space 22 of a discharge head or fitting 23, the lower end of said pipe having threaded connection with the upper threaded end of the wall of said space 19 while the upper end of said pipe has threaded connection with said fitting 23, said pipe 21 surrounding the vent pipe 7 and spaced therefrom to provide an annular conduit connecting the spaces above mentioned. The pipe 21 forms the main support for the head or fitting 23. An additional pipe 24 is slidably fitted to the head and surrounds that portion of the pipe 21 between the head 23 and the tube 10 and has spaced slots 25 formed therein adjacent said tube communicating with this drain passage 9. This tube or pipe 24 is primarily for imparting a finish to the device.

The vent pipe 7 extends through the head and, as usual, to a suitable place from which it may be vented to atmosphere. Where it extends through the upper part of the head 23 it passes through a sleeve nut 26 which has a threaded connection at 27 with the head and clamps a gasket 28 between it and the head to provide a fluid tight connection. This nut is also threaded at its upper end to engage the flanged sleeve nut 29 which also engages a suitable packing 30 surrounding the pipe 7 and interposed between said nut and the nut 26 and adapted to be pressed into sealing engagement with these parts by clamping pressure exerted by adjustment of the nut 29 relative to the nut 26. Removal of these parts from the head permits inspection or replacement of the filter screen 31 mounted within the space 22.

Nozzles either formed separate from or integral with the head 23 are adapted to receive water from the space 22. In the present instance the nozzles are formed integral with the head by the spray passages 32 which are radially disposed relative to a chamber 33 formed in the head. Passage of the washing water from the space 22 to the chamber 33 is controlled by one or more valve controlled ports 34. As herein shown ports 34 are diametrically arranged in the head and each port is controlled by a flat faced valve 35 mounted on or operatively connected with an operating spindle 36 associated with a casing 37 of known construction. Thus the water from the pipe 18 passes into the space 19 and thence upwardly between the pipes 7 and 21 to the space 22 and then through one or both of ports 34 to the chamber 33 and from thence through the nozzles or spray passages 32 which direct the water outwardly and downwardly toward the basin.

An annular soap dish 38 is secured to a tubular standard 39 which rests upon a part of the upper portion of the head 23.

We desire it to be understood that this invention is not to be limited to any particular form or arrangement of parts except in so far as such limitations are included in the claims.

What we claim as our invention is:

1. In an apparatus of the character described, the combination of a basin provided with a drain passage, a trap connected with said drain passage, a vent pipe extending upwardly from said trap, means for discharging washing water into the basin from a point above the same, a water supply connection extending to a point below the basin, and a connection between said discharging means and said supply connection.

2. In an apparatus of the character described, the combination of a basin provided with a drain passage, a trap connected with said drain passage, a vent pipe extending upwardly from said trap, means for discharging washing water into the basin from a point above the same, a water supply connection extending to a point below the basin, and a pipe connection between said discharging means and said supply connection coaxial with said vent pipe and extending through said drain passage.

3. In an apparatus of the character described, the combination of a basin provided with a drain passage, a trap connected with said drain passage, a vent pipe extending upwardly from said trap, means for discharging washing water into the basin from a point above the same, and a water supply connection extending from said discharging means to a point below said basin including a pipe connected to said trap and extending through said drain passage.

4. In an apparatus of the character described, the combination of a basin provided with a drain passage, a trap connected with said drain passage, a vent pipe extending upwardly from said trap and through said drain passage and concentric with said passage, means for discharging washing water into the basin from a point above the same, an annular water supply conduit between said discharging means and said trap including a pipe surrounding a portion of said vent pipe, and a supply connection below the basin to said conduit.

5. In an apparatus of the character described, the combination of a basin provided with a drain passage, a trap connected with said drain passage, a vent pipe extending upwardly from said trap and through said drain passage, a nozzle supply fitting surrounding a portion of said vent pipe above the basin, a water supply connection in said trap, and a pipe surrounding a portion of said vent pipe and forming with said vent an annular conduit connecting said supply connection with said fitting.

6. In an apparatus of the character described, the combination of a basin provided with a drain passage, a trap connected with said drain passage, a vent pipe extending upwardly from said trap and through said drain passage, a water supply connection in said trap surrounding said vent pipe, a nozzle supply fitting surrounding a portion of said vent pipe above the basin and a pipe extending through and above and below said drain passage and forming with said vent pipe an annular conduit connecting said supply connection with said fitting.

HOWARD A. MULLETT.
HERMAN E. HEINE.